US006643091B2

United States Patent
Coffin et al.

(10) Patent No.: US 6,643,091 B2
(45) Date of Patent: Nov. 4, 2003

(54) AUTOMATED DATA CARTRIDGE IMPORT/EXPORT DRAWER

(75) Inventors: Paul C Coffin, Ft Collins, CO (US); Michael J. Chaloner, Fort Collins, CO (US); Richard Lynn Gardner, Jr., Greeley, CO (US)

(73) Assignee: Hewlett-Packard Development Company, Houston, TX (US)

( * ) Notice: Subject to any disclaimer, the term of this patent is extended or adjusted under 35 U.S.C. 154(b) by 310 days.

(21) Appl. No.: 09/799,232

(22) Filed: Mar. 5, 2001

(65) Prior Publication Data
US 2002/0122271 A1 Sep. 5, 2002

(51) Int. Cl.[7] .............................................. G11B 15/68
(52) U.S. Cl. ...................................................... 360/92
(58) Field of Search ................................ 360/92, 98.04, 360/98.06; 369/30.43, 30.44, 30.41, 30.45

(56) References Cited

U.S. PATENT DOCUMENTS

| | | | |
|---|---|---|---|
| 3,666,337 A | 5/1972 | Sztorc ........................ 312/111 |
| 4,998,232 A | 3/1991 | Methlie et al. ................ 369/36 |
| 5,001,582 A | 3/1991 | Numasaki ................ 360/98.06 |
| 5,010,536 A | 4/1991 | Wanger et al. ............ 369/98.06 |
| 5,014,255 A | 5/1991 | Wanger et al. ................ 369/36 |
| 5,043,962 A | 8/1991 | Wanger et al. ................ 369/36 |
| 5,045,958 A | * 9/1991 | Leonard et al. ............... 360/92 |
| 5,255,251 A | 10/1993 | Fitzgerald et al. ............ 369/36 |
| 5,337,297 A | * 8/1994 | Kvifte et al. ............. 369/30.47 |
| 5,371,640 A | * 12/1994 | Kvifte et al. ................. 360/92 |
| 5,402,285 A | * 3/1995 | Theobald et al. .............. 360/69 |
| 5,442,500 A | * 8/1995 | Hidano et al. ................. 360/92 |
| 5,544,146 A | 8/1996 | Luffel et al. ................. 369/178 |
| 5,638,349 A | 6/1997 | Rugg et al. .................... 369/36 |
| 5,644,445 A | 7/1997 | Ishikawa ...................... 360/71 |
| 5,659,440 A | 8/1997 | Acosta et al. ................. 360/92 |
| 5,684,654 A | * 11/1997 | Searle et al. ................... 360/92 |
| 5,731,926 A | * 3/1998 | Gallo et al. .................... 360/92 |
| 5,856,894 A | * 1/1999 | Marlowe ....................... 360/92 |
| 5,894,941 A | * 4/1999 | Woodruff .................. 211/41.12 |
| 5,940,354 A | 8/1999 | Inoue ........................... 369/35 |
| 5,951,132 A | 9/1999 | Cirocco ................. 312/334.46 |
| 5,999,356 A | 12/1999 | Dimitri et al. ................. 360/71 |
| 6,025,972 A | 2/2000 | Schmidtke et al. ....... 360/98.06 |
| 6,038,099 A | 3/2000 | Heinze et al. ................. 360/92 |
| 6,157,513 A | * 12/2000 | Coffin et al. ................... 360/92 |
| 6,160,786 A | 12/2000 | Coffin et al. ................ 369/178 |
| 6,424,481 B1 | * 7/2002 | Theobald et al. ............. 360/69 |

FOREIGN PATENT DOCUMENTS

| | | |
|---|---|---|
| DE | 3511161 A1 | 3/1985 |
| EP | 1063646 | 12/2000 |
| WO | WO 85/02051 | 5/1985 |
| WO | WO 90/05362 | 5/1990 |

OTHER PUBLICATIONS

U.S. patent application Ser. No. 09/179,793, filed Oct. 27, 1998, for "Mail Slot Datga Cartridge Exchange System for Use with a Data Storage System" of Nicholas D. Thayer, et al.

U.S. patent application Ser. No. 09/257,322, filed Feb. 25, 1999, for "Data Cartridge Import/Export Drawer Having Three-Element, Two Configuration Slide" of Mueller, et al.

European Patent Office Search Report dated Mar. 27, 2003, in corresponding EPO application No. 01123469.7 of Hewlett-Packard Co.

* cited by examiner

*Primary Examiner*—Jefferson Evans (57) ABSTRACT

A data cartridge exchange apparatus for use in a data storage system may comprise a drawer sized to receive at least one data cartridge. The drawer is operatively associated with a cartridge handling system of the data storage system so that the drawer may be moved by the cartridge handling system between a retracted position and an extended position.

15 Claims, 10 Drawing Sheets

AUTOMATED DATA CARTRIDGE IMPORT/EXPORT DRAWER

FIELD OF INVENTION

This invention relates to data storage systems in general, and more specifically to a data storage system having an automated data cartridge exchange drawer.

BACKGROUND

Many different types of data storage systems exist and are being used to store data cartridges at known locations and to retrieve those data cartridges from the storage locations so that data may be written to or read from those data cartridges. Such data storage systems are often referred to as "juke box" data storage systems, particularly if they can accommodate a large number of individual data cartridges.

A typical data storage system may include one or more different types of cartridge receiving devices for holding the various data cartridges. For example, one type of cartridge receiving device may comprise a cartridge storage rack or "magazine." The cartridge storage racks or magazines usually include cartridge storage slots which serve as storage locations for the data cartridges. The various cartridge storage racks or magazines of the data storage system are commonly arranged so that they form one or more vertical stacks, although other configurations are possible. Another type of cartridge receiving device may comprise a cartridge read/write device. The cartridge read/write device may be located adjacent a cartridge magazine, although the cartridge read/write device may be positioned at any convenient location.

The data storage system may also be provided with a cartridge handling system for transporting the data cartridges between the various cartridge receiving devices, e.g., between the cartridge storage racks and the cartridge read/write devices. A typical cartridge handling system may include a cartridge access device for accessing the various data cartridges contained in the cartridge receiving devices, as well as a positioning system for moving the cartridge access device among the various cartridge receiving devices contained in the data storage system.

Data storage systems of the type described above are usually connected to a host computer system (not shown) which may access or store data on the data cartridges. For example, if certain data contained on a particular data cartridge is desired, the host computer system will issue commands to a control system associated with the data storage system. In response to those commands, the control system will actuate the positioning system which moves the cartridge access device along the cartridge storage racks or magazines until the cartridge access device is positioned adjacent the desired data cartridge. The cartridge access device may then remove the desired cartridge from the cartridge storage rack and carry it to the cartridge read/write device. Once properly positioned adjacent the cartridge read/write device, the cartridge access device may insert the selected data cartridge into the cartridge read/write device so that the host computer may thereafter read data from or write data to the selected data cartridge. After the read/write operation is complete, the cartridge access device may remove the data cartridge from the cartridge read/write device and return it to its appropriate location in the cartridge storage rack.

It is often necessary or desirable for a system operator to periodically access one or more of the data cartridges contained within such a data storage system. For example, it may be necessary for the system operator to remove certain of the data cartridges from time to time if they become filled with data that is to be archived at another location. The system operator may then replace the filled data cartridges with blank or empty data cartridges. In another situation, the system operator may desire to remove one or more of the data cartridges and replace it or them with a substitute data cartridge or cartridges containing different data.

In order to accommodate the foregoing needs, many data storage systems are provided with an access panel to allow the system operator to access the data cartridges stored within the data system. While such an arrangement does allow the system operator to access the data cartridges, it is usually difficult and cumbersome to implement in practice. For example, since the access panel needs to be removed in order to access the data cartridges, the data storage system must be temporarily shut-down or suspended in order to prevent injury to the system operator should the cartridge access device move while the system operator's hand is inside the data storage system. Another difficulty is that it is often difficult for the system operator to locate the particular data cartridges that are to be replaced. Still another disadvantage is that once the access panel has been replaced, it is necessary for the data storage system to re-inventory all the data cartridges contained therein. Such re-inventory processes are time consuming and difficult to justify, particularly if only one cartridge has been replaced. Nevertheless, the data storage system must re-inventory all of the data cartridges within the data storage system before it can be returned to service.

Partly in an effort to solve some of the aforementioned problems, data storage systems have been developed that include extendable drawers that can be manually pulled open by the system operator to allow the system operator to access the data cartridges stored in the data storage systems. Such an extendable drawer is useful in that it allows a system operator to access one or more data cartridges without the need to remove a separate access panel.

Unfortunately, the drawer type of data cartridge exchange system is not without its disadvantages. For example, if the drawer is manually operated (i.e., manually opened and closed by the system operator) some type of safety interlock device should be provided to prevent operation of the data storage system when the drawer is opened. While it is possible to provide a independent actuator system for the drawer, thereby allowing the drawer to be automatically opened and closed, such automatic actuator systems add additional components, thus complexity, to the data storage system. Moreover, the independent failure of such an automatic actuator system will prevent the data cartridges from being accessed even though the other portions of the data storage system may remain fully operational.

SUMMARY OF THE INVENTION

Data cartridge exchange apparatus for use in a data storage system may comprise a drawer sized to receive at least one data cartridge. The drawer is operatively associated with a cartridge handling system of the data storage system so that the drawer may be moved by the cartridge handling system between a retracted position and an extended position.

Also disclosed is a method for importing and exporting at least one data cartridge into and out of a data storage system that comprises the steps of: adapting a drawer and a cartridge access device of the data storage system to be engagable, the drawer being sized to receive the at least one data cartridge and being movable between a retracted position and an extended position; engaging the drawer and the cartridge access device; and moving the cartridge access device so that the drawer is moved between the retracted and extended positions.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
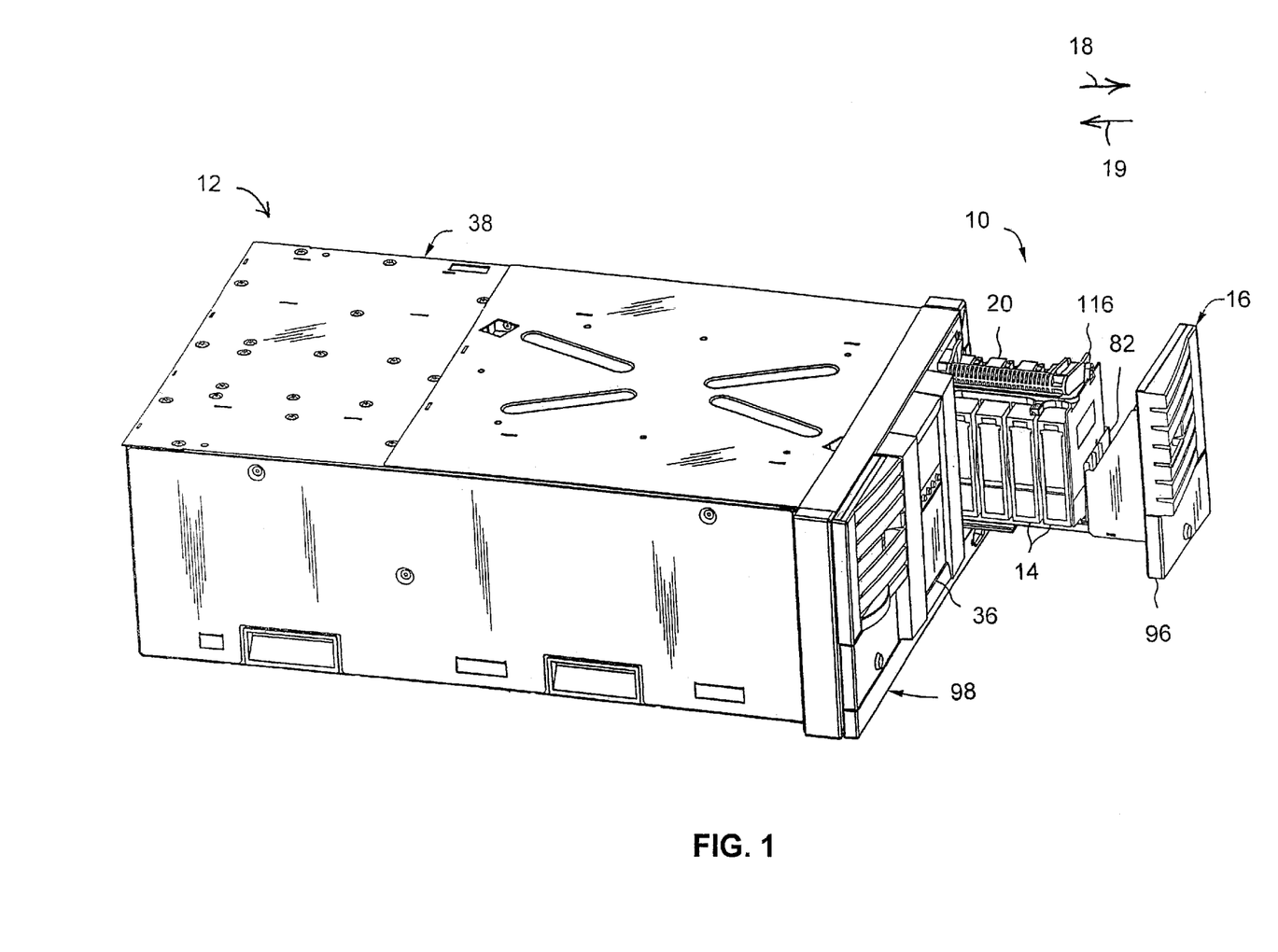
FIG. 1 is a perspective view of a data storage system having a data cartridge exchange apparatus according to one embodiment of the present invention.

A data cartridge exchange apparatus 10 according to one preferred embodiment of the present invention is shown in FIG. 1 and is described herein as it could be used in conjunction with a data storage system 12. The data cartridge exchange apparatus 10 allows at least one data cartridge 14 stored in the data storage system 12 to be accessed by a system operator (not shown) during the operation of the data storage system 12. For example, the system operator may use the data cartridge exchange apparatus 10 to withdraw a certain data cartridge 14 and replace it with a substitute data cartridge (not shown). The data cartridge exchange apparatus 10 thereby provides a convenient way for the system operator to deposit and withdraw selected data cartridges into and from the data storage system 12.

Figure 2:
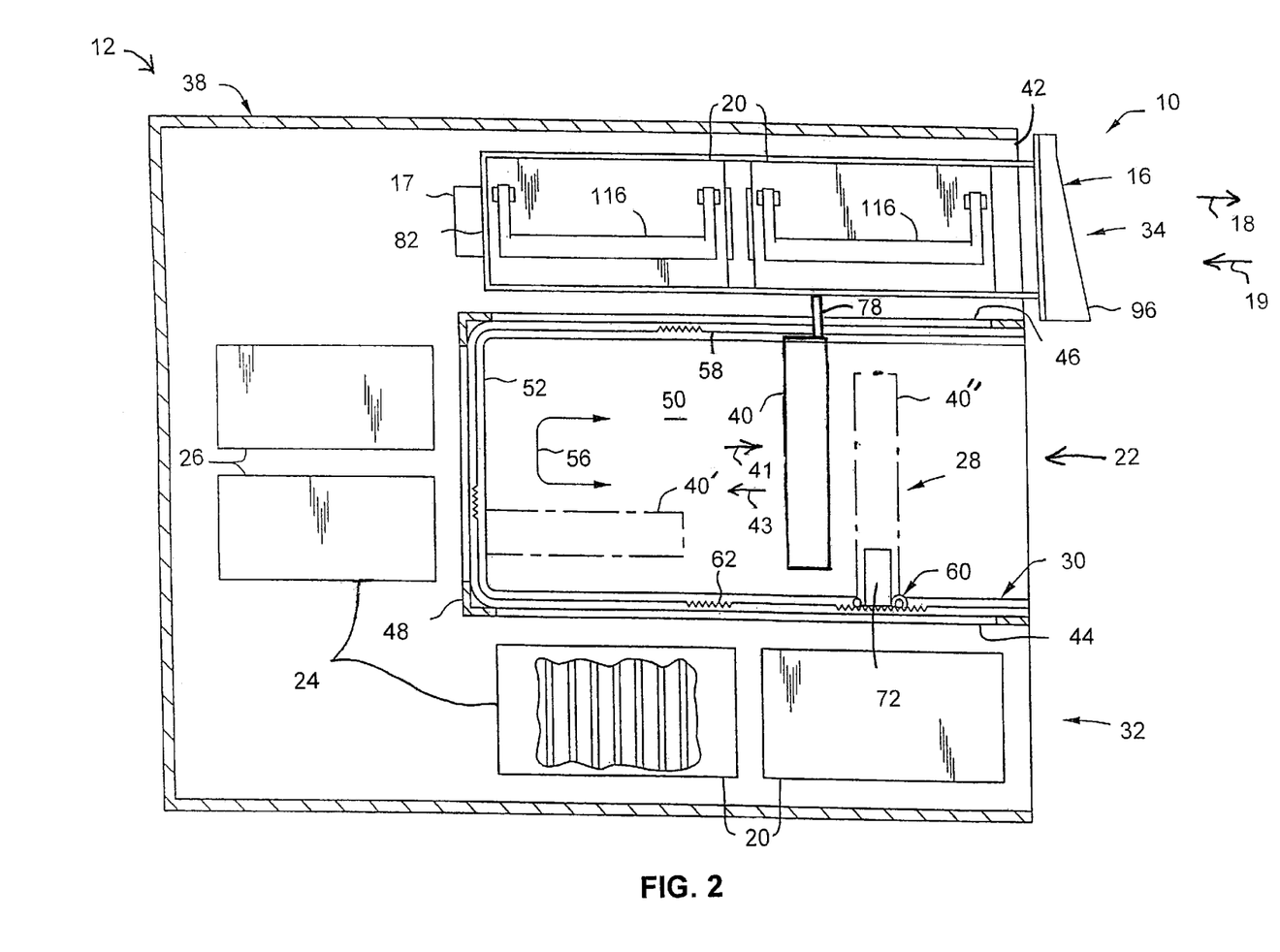
FIG. 2 is a plan view of the data storage system shown in FIG. 1 illustrating the cartridge handling system engaged with the data cartridge exchange drawer according to one embodiment of the present invention.

With reference now primarily to FIGS. 1 and 2, the data cartridge exchange apparatus 10 utilized in one preferred embodiment may comprise a drawer 16 slidably mounted to the data storage system 12 by a drawer mounting system 17 (FIG. 9) so that the drawer 16 may be moved between a retracted or closed position (shown in FIG. 2) and an extended or open position (shown in FIG. 1), i.e., generally in the directions indicated by arrows 18 and 19. The drawer 16 may be configured to receive one or more data cartridges 14, which in one preferred embodiment, may be contained within one or more cartridge magazines 20. That is, the drawer 16 may be configured to receive one or more cartridge magazines 20, with each cartridge magazine 20 being configured to receive one or more data cartridges 14. Alternatively, and as will be described in greater detail below, the drawer 16 may be configured to directly accept one or more data cartridges 14 without the need for a separate cartridge magazine 20.

To move the drawer 16 between the retracted and extended positions, the data cartridge exchange apparatus 10 may be operatively associated with a cartridge handling system 22 (FIGS. 2 and 4) of the data storage system 12. The cartridge handling system 22 is used to transport the data cartridges 14 between the various cartridge receiving devices 24, e.g., between the cartridge magazines 20 and the cartridge read/write devices 26 of the data storage system 12. However, according to the present invention, the cartridge handling system 22 may also be used to move the drawer 16 between the retracted and extended positions. That is, the drawer 16 may be engaged with a cartridge access device 28 of the cartridge handling system 22 so that the drawer 16 is moved in the directions indicated by arrows 18 and 19 when the cartridge access device 28 is moved in the directions indicated by arrows 41 and 43, respectively. See FIG. 2. For example, in one embodiment, a finger assembly 78 of the cartridge access device 28 engages a notch 80 provided on a data cartridge 14 contained within the drawer 16. See FIG. 8.

Since the drawer 16 may contain more than one data cartridge 14, it is generally preferred, but not required, that the data cartridge exchange apparatus 10 be operable to selectively move the drawer 16 to any one of a plurality of intermediate positions between the extended and retracted positions. This allows the data cartridge exchange apparatus 10 to expose for the system operator some, but not necessarily all, of the data cartridges 14 and/or data cartridge positions or storage locations provided in the drawer 16. It is also preferable to allow the system operator to select the number of data cartridges 14 or the particular data cartridge 14 that is to be made accessible to the system operator. That is, in response to the system operator's selection, the data cartridge exchange apparatus 10 moves or extends the drawer 16 a sufficient distance so that the selected number of data cartridges 14 are exposed. By providing the data cartridge exchange apparatus 10 with these features, the system operator's task of locating the desired data cartridge (s) is greatly simplified. Moreover, in the event the system operator chooses to have less than all of the data cartridges 14 within the drawer 16 exposed, the data storage system 12 will need to re-inventory only the data cartridges 14 that were exposed and will not need to re-inventory all of the data cartridges 14 contained within the drawer 16.

The data cartridge exchange apparatus 10 may be operated as follows to allow the system operator to access the various data cartridges 14 contained within the data storage system 12. Consider, for example, a situation wherein the data storage system 12 has been provided with a plurality of data cartridges 14. During normal operation, the drawer 16 may remain in the fully retracted or closed position shown in FIG. 2, thereby allowing the cartridge handling system 22

(FIGS. 2 and 4) internal to the data storage system 12 to access all of the data cartridges 14 contained therein. If the need arises for the system operator to access one or more of the data cartridges 14, such as, for example, to remove one or more of the data cartridges 14 and replace it or them with a substitute data cartridge or data cartridges, the system operator may enter instructions for the drawer 16 to be opened. The instructions may be entered into either the host computer system (not shown) to which the data storage system 12 is connected or a control panel 36 (FIG. 1) of the data storage system 12. In response to the instructions, a control system (not shown) contained within the data storage system 12 actuates the cartridge positioning system 30 of cartridge handling system 22 which positions the cartridge access device 28 adjacent the drawer 16 (e.g., position 40). See FIGS. 2 and 7. The finger assembly 78 of the cartridge access device 28 is then caused to engage the notch 80 of a data cartridge 14 contained within the drawer 16. See FIG. 8. Next, the cartridge access device 28 is moved in the direction indicated by arrow 41 (FIG. 2) by the cartridge positioning system 30 until the drawer 16 is opened (i.e., moved in the direction indicated by arrow 18) in accordance with the system operator's instructions.

Once the drawer 16 is opened or extended, the system operator may access the exposed data cartridges 14 for the exchange, removal, or replacement of the same. While the drawer 16 is in the extended position, the data storage system 12 may remain operational. That is, the cartridge access device 28 may disengage itself from the drawer 16 so that the cartridge handling system 22 may continue to access the data storage cartridges 14 remaining in the data storage system 12 and accessible to the cartridge access device 28.

Once the system operator is finished accessing the exposed data cartridges 14, the system operator may then enter instructions into the host computer system or the control panel 36 for the drawer 16 to be closed. Alternatively, the data cartridge exchange apparatus 10 may close the drawer 16 after a predetermined amount of time has elapsed. In either case and assuming that the cartridge access device 28 was disengaged from the drawer 16, the control system actuates the cartridge positioning system 30 which positions the cartridge access device 28 adjacent the drawer 16. The finger assembly 78 is then caused to engage the notch 80 of a data cartridge 14 contained within the drawer 16. Next, the cartridge positioning system 30 moves the cartridge access device 28 in the direction indicated by arrow 43 so that the drawer 16 is moved along therewith in the direction indicated by arrow 19 until the drawer 16 is closed. As explained in greater detail below, should the finger assembly 78 become disengaged from the notch 80 while the drawer 16 is being closed, the finger assembly 78 may then push or exert a force on the data cartridge 14 positioned adjacent to the data cartridge 14 having the notch 80 from which the finger assembly 78 became disengaged thereby allowing the cartridge handling system 22 to continue closing the drawer 16.

After the drawer 16 has been fully closed, the cartridge access device 28 may be disengaged from the drawer 16. The data storage system 12 may then "re-inventory" the data cartridges 14 stored within the data storage system. In the present example, the data storage system 12 need re-inventory only those data cartridges 14 that were exposed to the system operator, which depending on the system operator's instructions, may be substantially less than all of the data cartridges 14 contained within the drawer 16.

It should be noted that any of the data cartridges 14 contained within the data storage system 12 may be accessed via the data cartridge exchange apparatus 10. For example, data cartridges 14 stored in the magazines 20 that are positioned in the "fixed" cartridge storage array 32 (FIG. 2) located opposite the drawer 16 also may be accessed by instructing the cartridge handling system 22 to move the selected data cartridges 14 from the "fixed" cartridge storage array 32 (i.e., those cartridge magazines 20 that are not contained in the drawer 16) to the "moveable" cartridge storage array 34 (i.e., those cartridge magazines 20 contained in the drawer 16). After the selected data cartridges 14 have been transferred from the fixed cartridge storage array 32 to the moveable cartridge storage array 34, the cartridge handling system 22 may then open the drawer 16 to provide the system operator with access to the recently transferred data cartridges 14.

A significant advantage of the present invention is that it provides for the automatic operation (i.e., automatic opening and closing) of the drawer 16 without the need for a separate actuator system. The present invention also provides an easy and convenient way for a system operator to obtain access to one or more of the data cartridges 14 contained within the data storage system 12, but without the need to remove a panel or panels on the data storage system and without the need for the system operator to first unlock the drawer and then manually open and close the drawer. Indeed, the system operator may access the data cartridges 14 within the data storage system 12 by simply entering the appropriate instructions into either the host computer or the control panel 36 of the data storage system 12.

Another significant advantage of the present invention is that it allows the system operator to either select the particular data cartridge or number of data cartridges that will be exposed. That is, the present invention provides a means of controlling the number of data cartridges 14 within the drawer 16 that will be exposed.

Yet another significant advantage of the present invention is that it allows one or more data cartridges 14 to be accessed by the system operator without the need to suspend the operation of the data storage system 12. The data storage system 12 also does not have to "re-inventory" all of the data cartridges 14 stored within the data storage system 12 after the system operator accesses the drawer 16. Rather, the data storage system 12 needs to re-inventory only the data cartridges 14 that were exposed to the system operator, which may even be substantially less than the number of data cartridges 14 that were within the drawer 16.

Still yet another significant advantage of the present invention is that by eliminating the need for system operators to manually open and close the drawers, the present invention reduces the possibility that the data storage system 12 may be damaged by a system operator applying an excessive force when manually opening or closing the drawers.

Having briefly described the data cartridge exchange apparatus 10, as well as some of its more significant features and advantages, the various embodiments of the data cartridge exchange apparatus according to the present invention will now be described in detail. However, before proceeding with the description, it should be noted that the data cartridge exchange apparatus 10 according to the present invention may be utilized in any of a wide range of data storage systems now known or that may be developed in the future for storing and accessing one or more data cartridges therein. Accordingly, the present invention should not be regarded as limited to the particular data storage system 12 shown and described herein. It should also be noted that while the data cartridge exchange apparatus 10 is shown and described herein as it could be used to store and retrieve magnetic data cartridges 14 having a standard size and configuration (e.g., digital linear tape or "DLT" cartridges), it is not limited to any particular type or style of data cartridge. Indeed, the data cartridge exchange apparatus 10 according to the present invention could be used with any type of data storage device comprising any type of data storage medium now known or that may be developed in the future. Consequently, the present invention should not be regarded as limited to use with the particular type and style of data cartridge 14 shown and described herein.

With the foregoing considerations in mind, one embodiment of the data cartridge exchange apparatus 10 is shown in FIG. 1 as it may be used in a data storage system 12 of the type used to store and access large amounts of data contained on one or more data cartridges 14. As mentioned earlier, the data storage system 12 may comprise any of a wide range of data storage systems now known in the art or that may be developed in the future for storing and accessing one or more data cartridges 14. By way of example, the data storage system 12 may comprise a data storage system of the type shown and described in U.S. Pat. No. 6,025,972 for "MULTI-PLANE TRANSLATING CARTRIDGE HANDLING SYSTEM" of Schmidtke, which is incorporated herein by reference for all that it discloses. Even though data storage systems are well-known in the art, a brief description of the data storage system 12 will be given in order to provide a more complete understanding of one environment in which may be used the data cartridge exchange apparatus 10.

Referring now primarily to FIG. 2, the data storage system 12 may comprise a main housing or chassis 38 configured to hold the various components of the data storage system 12. The housing 38 may comprise a generally rectangularly shaped structure adapted to receive one or more cartridge receiving devices 24 and the cartridge handling system 22, which may include the cartridge access device 28 and the cartridge positioning system 30. The housing 38 may also be adapted to receive any of a wide range of other components or devices (e.g., control systems, power supplies, etc.) well-known in the art and that may be required for the operation of the data storage system 12. The housing 38 may also be provided with a cartridge magazine access end 42 to allow the system operator to access the cartridge magazines 20. More specifically, the cartridge magazine access end 42 allows the drawer 16 to be opened so that the cartridge magazines 20 positioned within the drawer 16 are outside the housing 38 and exposed to the system operator.

Figure 3:
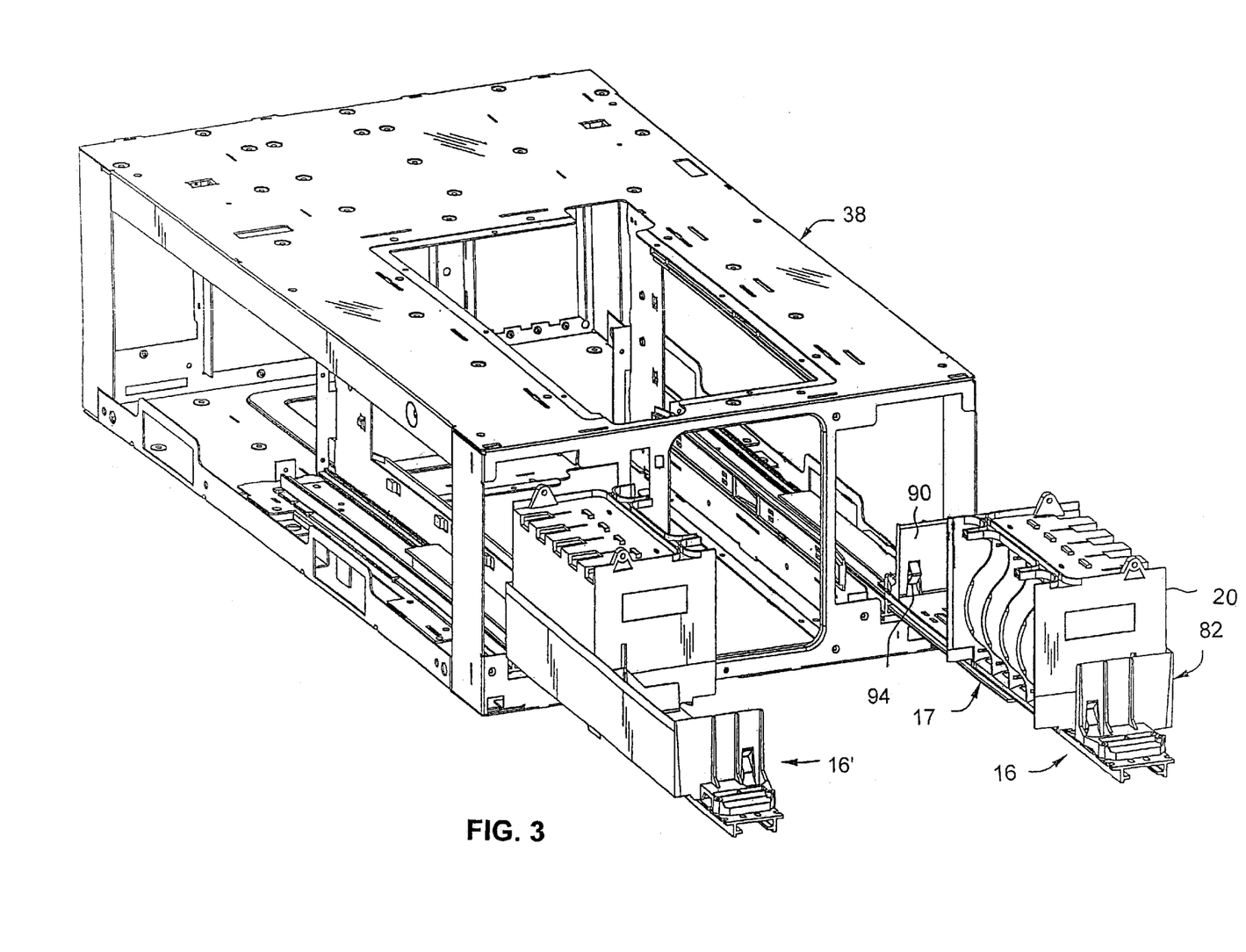
FIG. 3 is a perspective view of another embodiment of a data storage system having two data cartridge exchange drawers.

Before proceeding with the description, it should be noted that the data storage system 12 may be provided with any convenient number of drawers 16. For example, in the embodiment shown and described herein, the data storage system 12 is provided with a single drawer 16. Alternatively, the data storage system 12 may be provided with a second drawer 16', as best seen in FIG. 3. If the data storage system 12 is provided with a second drawer 16', the system operator may access the data cartridges contained in the second drawer 16' in the manner already described for the first drawer 16. However, since each drawer assembly (e.g., 16, 16') may be essentially identical, knowledge of the number of drawers that may be provided to a particular data storage system 12 is not required to understand and practice the present invention. Consequently, the remainder of the description will be directed to a data storage system 12 having only a single drawer 16.

Continuing now with the description, the cartridge handling system 22 of the data storage system 12 may be used to transfer data cartridges 14 between one or more of the cartridge receiving devices 24, such as one or more cartridge magazines 20 and one or more cartridge read/write devices 26. The various cartridge receiving devices 24 may be positioned at various locations within the data storage system 12 so that they define a generally U-shaped configuration, as best seen in FIG. 2, although other configurations are possible. The cartridge handling system 22 may comprise a generally rectangularly shaped structure having a pair of opposed side portions 44 and 46 and an end portion 48. A "fixed" cartridge storage array 32 may be positioned adjacent the first side portion 44 of the cartridge handling system 22. The fixed cartridge storage array 32 may comprise any of a wide range of devices suitable for receiving one or more data cartridges 14. By way of example, in one preferred embodiment, the fixed cartridge storage array 32 may comprise a pair of cartridge magazines 20, each of which is configured to hold a plurality of data cartridges 14. In an alternative embodiment, the fixed cartridge array 32 may be replaced by a separate cartridge exchange drawer 16', as best seen in FIG. 3. As explained above, such an alternative configuration would allow the data cartridges 14 positioned adjacent the first side portion 44 to be accessed in essentially the same manner as those contained in the drawer 16 adjacent the opposed side portion 46.

The drawer 16 comprising the data cartridge exchange apparatus 10 may be mounted adjacent the second side portion 46 of the cartridge handling system 22. The drawer 16 may be configured to receive at least one data cartridge 14. By way of example, in one preferred embodiment, the drawer 16 is configured to receive a pair of cartridge magazines 20, each of which may be configured to hold a plurality of data cartridges 14. The drawer 16 and the data cartridges 14 stored therein together define a "moveable" cartridge storage array 34. A pair of cartridge read/write devices 26 may be positioned adjacent the end portion 48 of the cartridge handling system 22 in the manner best seen in FIG. 2.

The cartridge handling system 22 may comprise a lower plate 50 having a U-shaped guide member or channel 52 and an upper plate 54 having a U-shaped guide member or channel (not shown) which guide the cartridge access device 28 along a generally U-shaped path 56 so that the cartridge access device 28 may access the data cartridges 14 contained in the various cartridge receiving devices 24.

Figure 4:
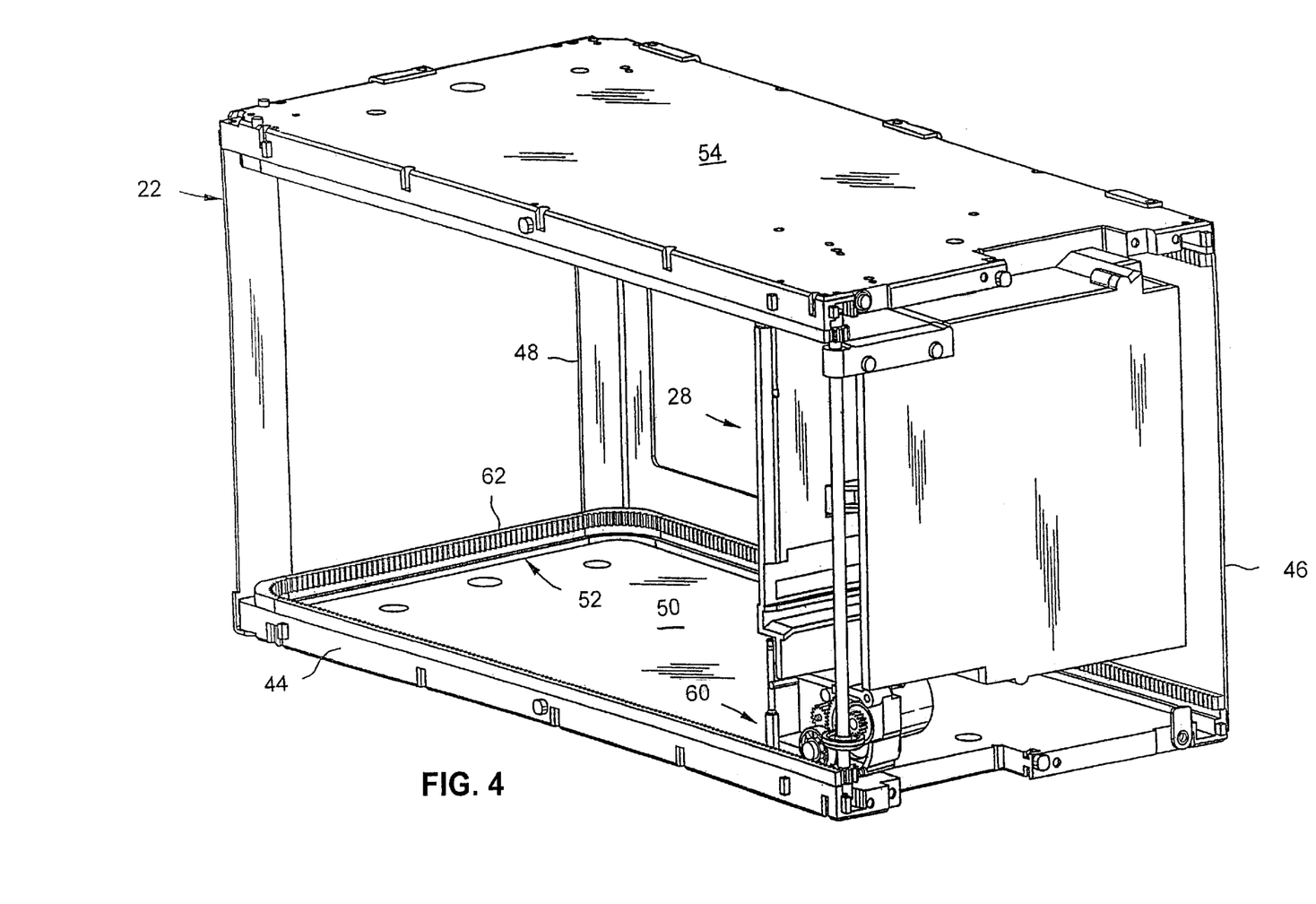
FIG. 4 is a perspective view of the cartridge handling system shown in FIG. 2.
Figure 5:
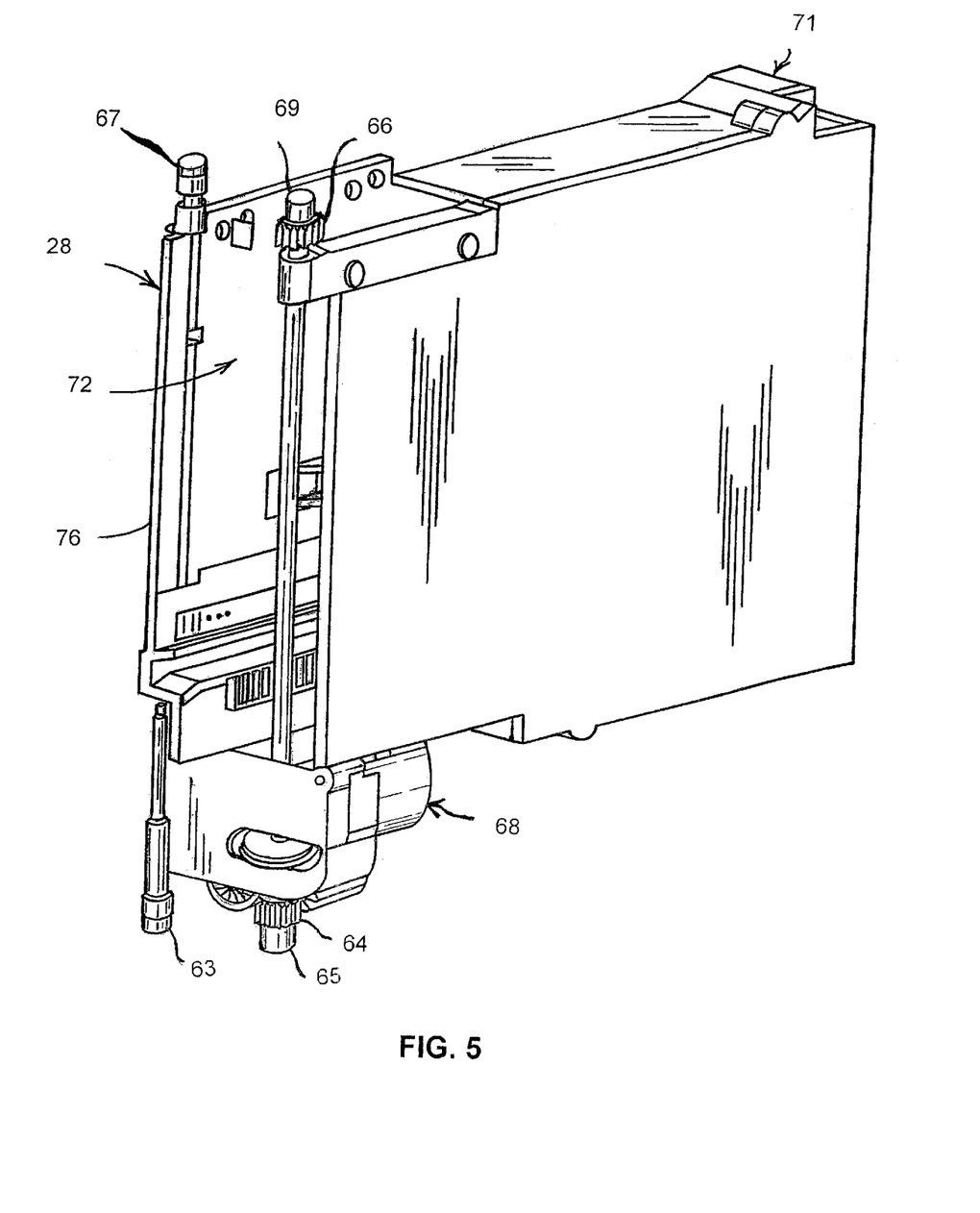
FIG. 5 is a perspective view of a cartridge access device that may be used in the cartridge handling system shown in 4.

The cartridge access device 28 is best seen in FIG. 5 and may comprise a portion of the cartridge positioning system 30 which moves the cartridge access device 28 to various positions (e.g., 40, 40', 40") along the various cartridge receiving devices 24 (e.g., the cartridge magazines 20 and the cartridge read/write devices 26) so that the cartridge access device 28 may access the data cartridges 14 contained therein. More specifically, the cartridge access device 28 may engage the lower U-shaped guide member or channel 52 (FIG. 2) provided on the lower plate 50 of the cartridge handling system 22 and the upper U-shaped guide member or channel provided on the upper plate 54 (FIG. 4) of the cartridge handling system 22. The lower guide member 52 and the upper guide member may each form substantially continuous members adjacent the various cartridge receiving devices 24 so that the cartridge access device 28 may be moved along the various cartridge receiving devices 24 generally following the U-shaped path 56. As best seen in FIG. 2, a portion 58 of the substantially continuous member of lower guide member 52 and a portion (not shown) of the substantially continuous member of upper guide member may each be located adjacent the drawer 16 so that the cartridge access device 28 may be moved alongside the drawer 16 in the directions indicated by arrows 41 and 43.

Referring now to FIGS. 4 and 5, the cartridge access device 28 may be moved along the lower guide member 52 and the upper guide member (i.e., following the U-shaped path 56) by an actuator system 60. In one preferred embodiment, the actuator system 60 may comprise a rack and pinion drive system having a substantially continuous lower gear rack 62 provided on the lower plate 50 at a position adjacent the lower U-shaped guide member or channel 52. Accordingly, the lower gear rack 62 defines a substantially continuous, U-shaped member. An upper gear rack (not shown) may be provided on the upper plate 54 at a position adjacent the upper U-shaped guide member and may also define a substantially continuous, U-shaped member. A lower pinion gear 64 may be mounted to the cartridge access device 28 so that it engages the U-shaped lower gear rack 62. A pair of lower bearing members 63, 65 mounted to the cartridge access device 28 are configured to be received by the lower U-shaped guide member or slot 52. The cartridge access device 28 may also be provided with a pair of upper bearing members 67, 69 and a upper pinion gear 66 which engage the upper U-shaped guide member and the upper U-shaped gear rack, respectively. A pinion drive assembly 68 mounted to the cartridge access device 28 is used to rotate the lower and upper pinion gears 64 and 66, thereby moving the cartridge access device 28 along the lower guide member 52 and the upper guide member, following the generally U-shaped path 56. See FIG. 2.

Figure 6:
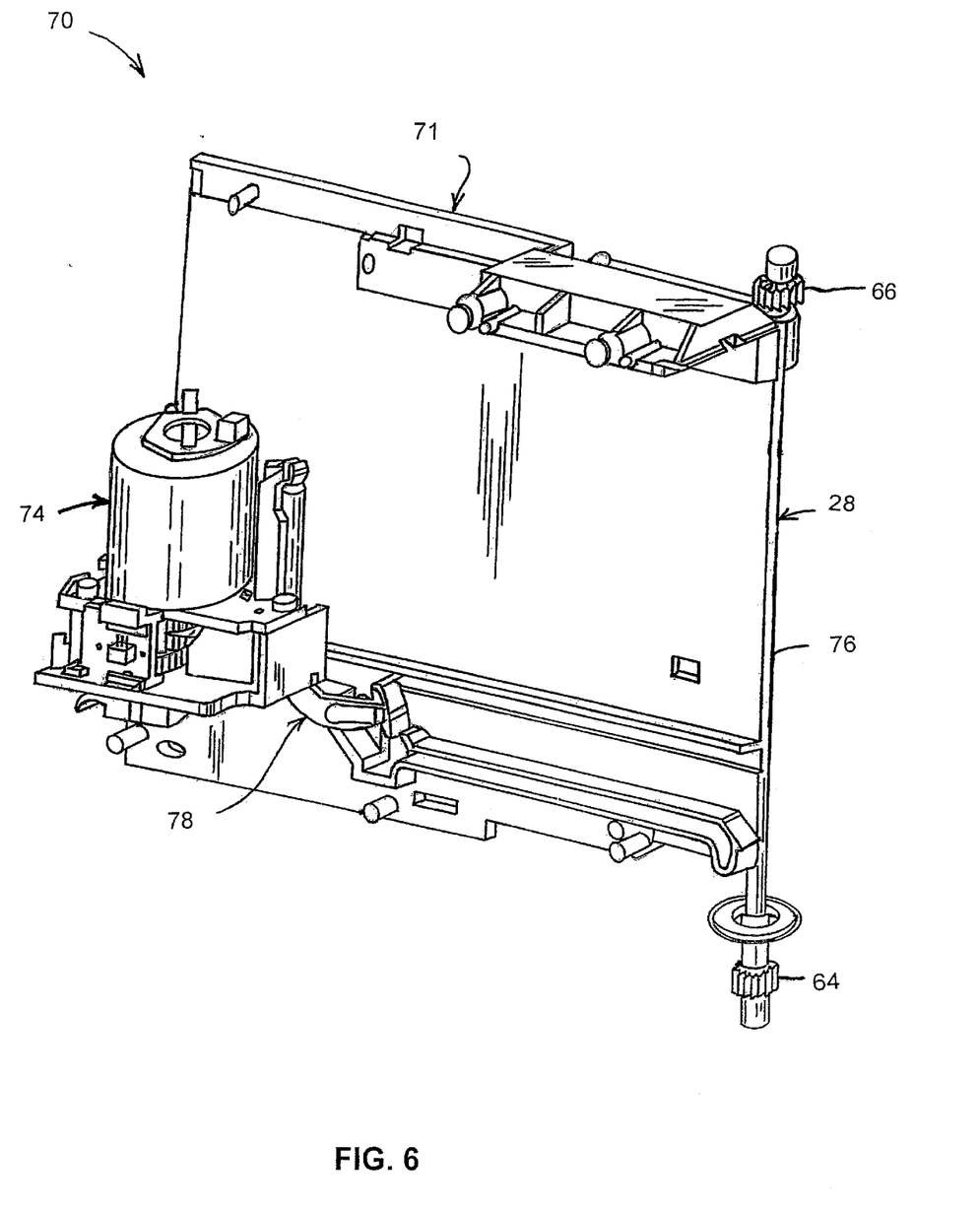
FIG. 6 is a perspective view of the cartridge access device shown in FIG. 5 with a side member removed to show the thumb and finger assemblies.
Figure 7:
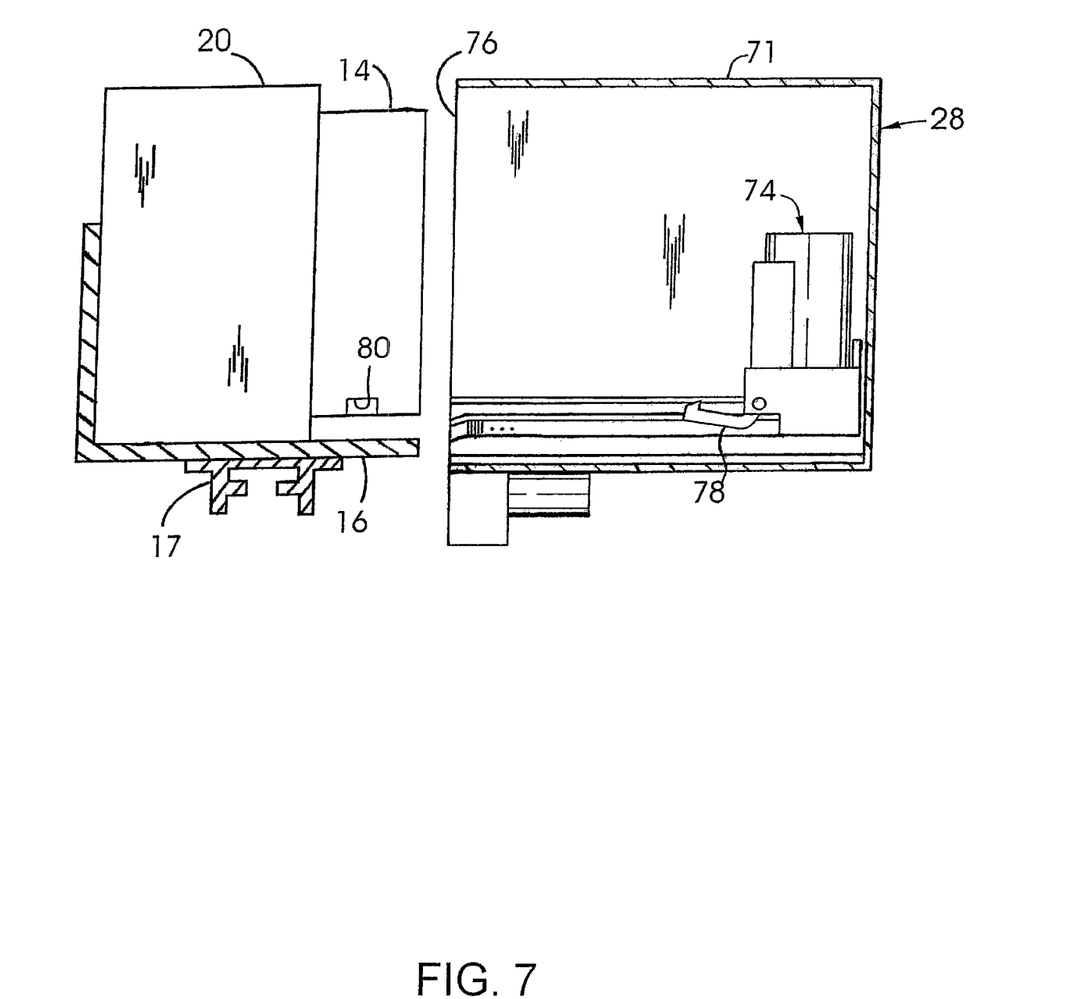
FIG. 7 is a simplified sectional view in elevation of the cartridge access device shown in FIG. 5 positioned adjacent a data cartridge within the drawer illustrating the thumb assembly in a retracted position.
Figure 8:
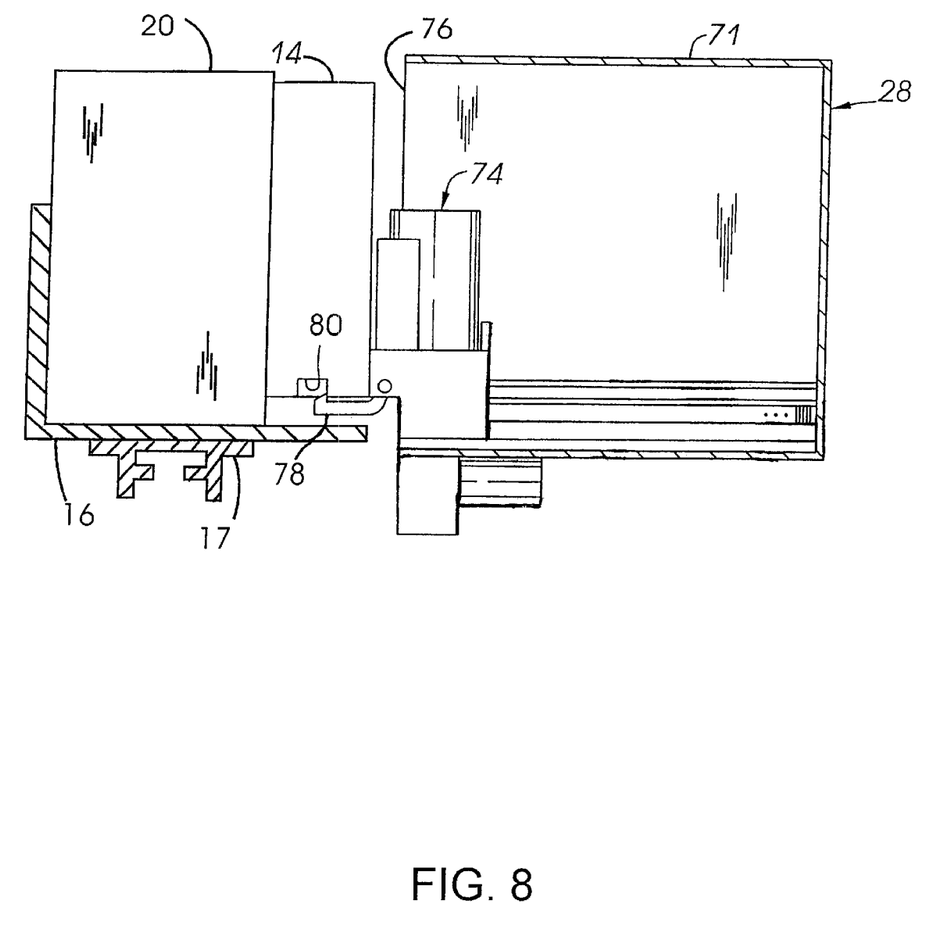
FIG. 8 is another simplified sectional view in elevation of the cartridge access device shown in FIG. 5 with the finger assembly engaged with the notch of a data cartridge contained within the drawer.

To load and retrieve the data cartridges 14 into and from the various cartridge receiving devices 24, the cartridge access device 28 may also be provided with a cartridge engaging assembly or "picker" 70 (FIGS. 6 through 8). The cartridge engaging assembly 70 contained within the cartridge access device 28 is adapted to engage a data cartridge 14 contained in a cartridge receiving device 24 and to draw the data cartridge 14 into the cartridge access device 28. The cartridge engaging assembly 70 is also adapted to load or insert the data cartridge 14 into a cartridge receiving device 24, e.g., either a cartridge magazine 20 or a cartridge read/write device 26, as the case may be. Stated simply, then, the cartridge engaging assembly 70 is used to retrieve data cartridges 14 from, and insert them into, the various cartridge receiving devices 24. The cartridge access device 28, which includes the cartridge engaging assembly 70, is used to transport the data cartridges 14 to desired locations within the data storage system 12.

The cartridge engaging assembly 70 may include a frame assembly 71 that defines an interior chamber or cavity 72 (FIG. 5) sized to receive a data cartridge 14. A cartridge plunge mechanism or "thumb" assembly 74 (FIG. 6) may be slidably mounted to the frame assembly 71 so that the thumb assembly 74 may be moved toward and away from the cartridge access end 76 of frame assembly 71. See FIGS. 7 and 8. The thumb assembly 74 may be provided with a finger assembly 78 configured to engage a notch 80 or other similar feature provided on the data cartridge 14 that extends about halfway through the data cartridge 14. The finger assembly 78 allows the thumb assembly 74 to engage and withdraw the data cartridge 14 from the cartridge receiving devices 24. As will be explained in greater detail below, the finger assembly 78 may also engage the notch 80 or engage a notch or other similar feature provided on the drawer 16 or mounting system 17 so that the drawer 16 may be moved along with the cartridge access 28.

The data storage system 12 may be connected to the host computer system that issues commands to a control system contained within the data storage system 12. For example, in one operational sequence, the control system in response to commands from the host computer system actuates the cartridge positioning system 30 which moves the cartridge access device 28 along the cartridge magazines 20 until it is positioned adjacent the desired data cartridge 14. See FIGS. 7 and 8. The cartridge engaging assembly 70 then removes the data cartridge 14 from the cartridge magazine 20 and draws it into the cartridge access device 28. The cartridge access device 28 transports the data cartridge 14 to the cartridge read/write device 26. The data cartridge 14 is then inserted into the cartridge read/write device 26 so that the host computer may thereafter read data from or write data to the data cartridge 14. After the read/write operation is complete, the cartridge engaging assembly 70 removes the data cartridge 14 from the cartridge read/write device 26 and draws it back into the cartridge access device 28 so that the cartridge 14 may be returned to its appropriate location in the cartridge magazine 20.

Regardless of the particular type of data storage system 12 in which the data cartridge exchange apparatus 10 is used, the data cartridge exchange apparatus 10 according to one preferred embodiment of the present invention may comprise a drawer 16 configured to receive one or more data cartridges 14. See FIG. 1. The arrangement is such that the drawer 16 comprises the moveable cartridge storage array 34 (FIG. 2) which forms a part of the "regular" cartridge storage array of the data storage system 12 when the drawer 16 is in the fully retracted or closed position. As used herein, the term "regular cartridge storage array" refers to both the fixed cartridge storage array 32 and the moveable cartridge storage array 34. Put in other words, the drawer 16 comprises a cartridge receiving device 24 that is accessible to the cartridge handling system 22 so that the data cartridges 14 carried thereby may be accessed by the cartridge handling system 22 during the normal or regular course of operation of the data storage system 12.

The drawer 16 utilized in one preferred embodiment of the invention may be formed by a cartridge magazine tray 82 that may be mounted directly to the mounting system 17. The magazine tray 82 may be configured to removably receive two (2) cartridge magazines 20 in the manner best seen in FIG. 9. Each cartridge magazine 20 in turn may be configured to receive five (5) data cartridges 14, although cartridge magazines 20 configured to receive a greater number or lesser number of data cartridges 14 may also be used. In the embodiment shown and described herein, the magazine tray 82 may comprise a generally rectangularly shaped member having a floor section 84, a back section 86, and opposed end walls 88 and 90 (end wall 90 is shown in FIG. 3). The magazine tray 82 may also be provided with a center divider section 92 located substantially between the end walls 88 and 90. Each end wall 88, 90 may be provided with a spring biasing member 94 to urge the cartridge magazines 20 against the center divider section 92, although this is not required.

The magazine tray 82 may be made from any of a wide range of materials, such as metals or plastics, suitable for the intended application. By way of example, in one preferred embodiment, the magazine tray 82 is molded as a single piece from a fiber reinforced polycarbonate plastic material. The cartridge magazines 20 may also be made from any of wide range of materials, depending on the requirements of the particular application. By way of example, the cartridge magazines 20 utilized in one preferred embodiment are also molded from a fiber reinforced polycarbonate plastic material.

Before proceeding with the description, it should be noted that in the embodiment shown and described herein, the cartridge magazines 20 carried by the magazine tray 82, forming drawer 16, are identical to the cartridge magazines 20 comprising the fixed cartridge storage array 32 (FIG. 2), although this is not necessary. Accordingly, the cartridge magazines 20 received by the drawer 16 comprise a cartridge receiving device 24 that is accessible to the cartridge handling system 22 during the normal or regular operation of the data storage system 12. However, other arrangements are possible. For example, the drawer 16 could be configured to directly receive one or more data cartridges 14 (i.e., without the need for a separate cartridge magazine 20). In still another configuration, the drawer 16 could comprise a hybrid arrangement, with certain areas of the drawer 16 being configured to directly receive individual data cartridges 14 and with other areas of the drawer 16 being sized to receive a cartridge magazine or magazines (e.g., cartridge magazine 20). Consequently, the present invention should not be regarded as limited to the particular configuration of the cartridge magazine tray 82 shown and described herein.

Continuing now with the description, the drawer 16 may also be provided with a front panel member or bezel 96 (FIG. 1). The front panel member 96 may also be attached directly to the mounting system 17, as was the magazine tray 82. Alternatively, the front panel member 96 may be attached to the magazine tray 82 or may even comprise an integral portion of the magazine tray 82. The front panel member 96 forms a part of the front panel or bezel 98 of the data storage system 12 when the drawer 16 is in the retracted position. The front panel member 96 also provides a convenient means for allowing the system operator to manually pull-open the drawer 16, for example, in the event the cartridge handling system 22 is inoperable and unable to open the drawer 16.

Figure 9:
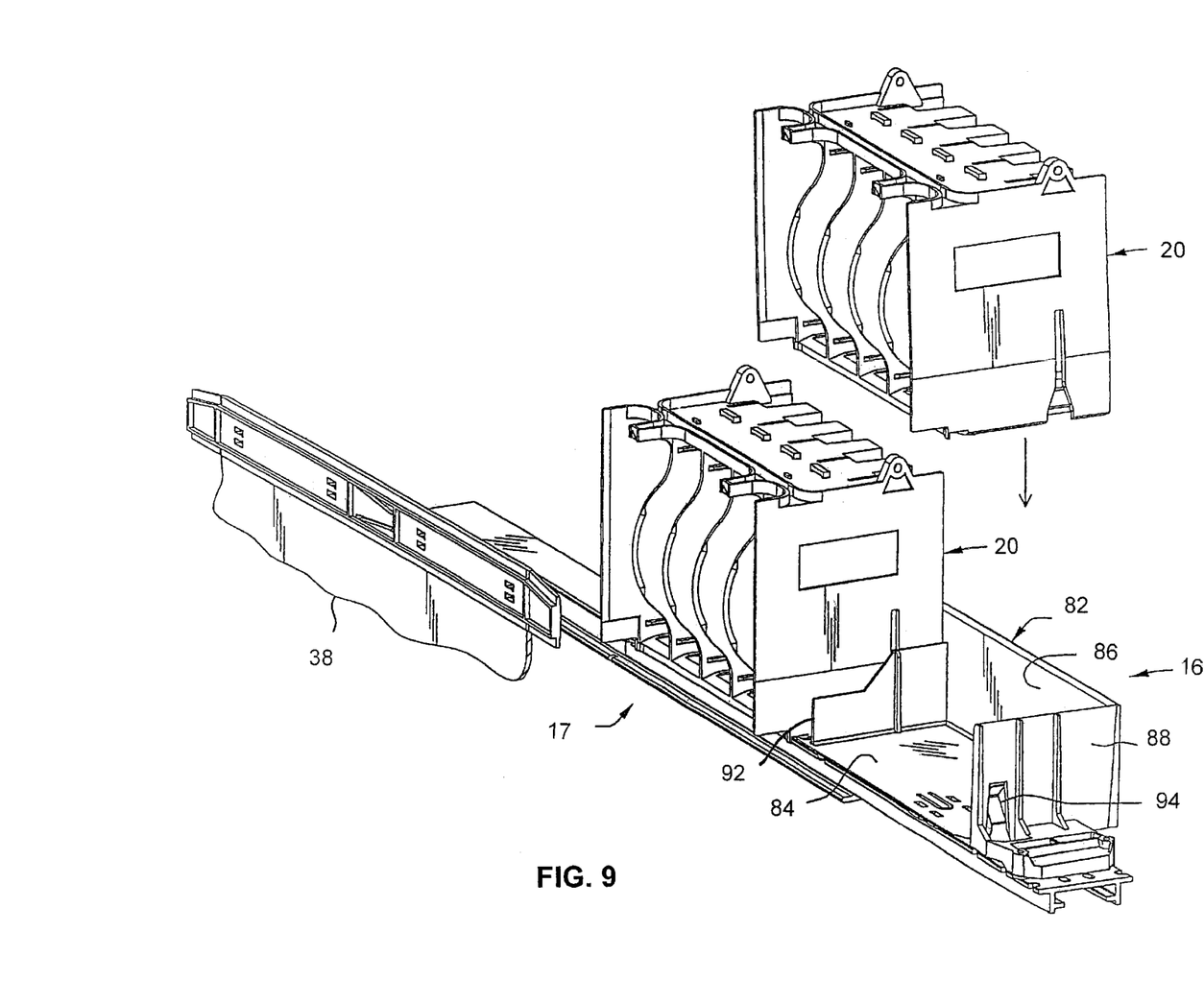
FIG. 9 is an exploded perspective view of the drawer and a drawer mounting system that may be used to slidably mount the drawer to the data storage system shown in FIG. 1.

Referring to FIGS. 3 and 9, the drawer 16 may be sized to be slidably received within the data storage system 12. More specifically, the drawer 16 may be slidably mounted to the housing 38 of the data storage system 12 with a drawer mounting system 17. The drawer mounting system 17 may allow the drawer 16 to be slidably moved into and out of the housing 38 between the extended and retracted positions. By way of example, the drawer mounting system 17 utilized in one preferred embodiment may comprise a drawer mounting system of the type shown and described in U.S. patent application Ser. No. 09/257,322 filed on Feb. 25, 1999 for "DATA CARTRIDGE IMPORT/EXPORT DRAWER HAVING THREE-ELEMENT, TWO-CONFIGURATION SLIDE" of Mueller, et al., which is incorporated herein by reference for all that it discloses. Alternatively, other types of mounting systems that are now known or that may be developed in the future could also be used.

To move the drawer 16 between the retracted and extended positions, the data cartridge exchange apparatus 10 may be operatively associated with the cartridge handling system 22 of data storage system 12. That is, the drawer 16 may be engaged with the cartridge access device 28 of cartridge handling system 22 so that the drawer 16 is moved in the directions indicated by arrows 18 and 19 when the cartridge access device 28 is moved in the directions indicated by arrows 41 and 43, respectively. See FIG. 2.

To engage the drawer 16 and the cartridge access device 28, the finger assembly 78 may engage the notch 80 provided on a data cartridge 14 contained within the drawer 16. See FIG. 8. However, since the notch 80 may not extend completely through the data cartridge 14, the finger assembly 78 may become disengaged from the notch 80 while the drawer 16 is being closed (i.e., moved in the direction indicated by arrow 19). If so, the finger assembly 78 may then push or exert a force on the data cartridge 14 positioned adjacent to the data cartridge 14 having the notch 80 from which the finger assembly 78 became disengaged thereby allowing the cartridge handling system 22 to continue closing the drawer 16. Moreover, since the drawer 16 may need to be moved while empty (i.e., with no data cartridges 14 therein), a dummy data cartridge (not shown) may be positioned within the drawer 16 so that the finger assembly 78 may engage a notch (also not shown) or other similar feature provided on the dummy data cartridge instead of the notch 80 of the data cartridge 14. In such an embodiment, it is preferable to minimize the size of the dummy data cartridge so as to conserve storage space within the drawer 16, although such is not required.

Alternatively, the finger assembly 78 may engage a notch (not shown) or other similar feature provided on either the drawer 16 or the mounting system 17. If the notch is provided on the drawer 16, it is generally preferred, but not required, that the notch be provided on the floor section 84 of the magazine tray 82 at a position where the notch may be easily accessed by the finger assembly 78 and at a position adjacent the end wall 90 so that the drawer 16 may be fully opened by the cartridge handling system 22. In another alternative embodiment, the cartridge access device 28 may be provided with a second finger assembly (not shown) that engages the notch provided on the drawer 16 or mounting system 17 to move the drawer 16 between the retracted and extended positions. In yet another alternative embodiment, the drawer 16 may be provided with a finger assembly that is configured to engage and does engage a notch (not shown) provided on the cartridge access device 28 so that the drawer 16 may be moved in the directions indicated by arrows 18 and 19 when the cartridge access device 28 is moved in the directions indicated by arrows 41 and 43, respectively.

Figure 10:
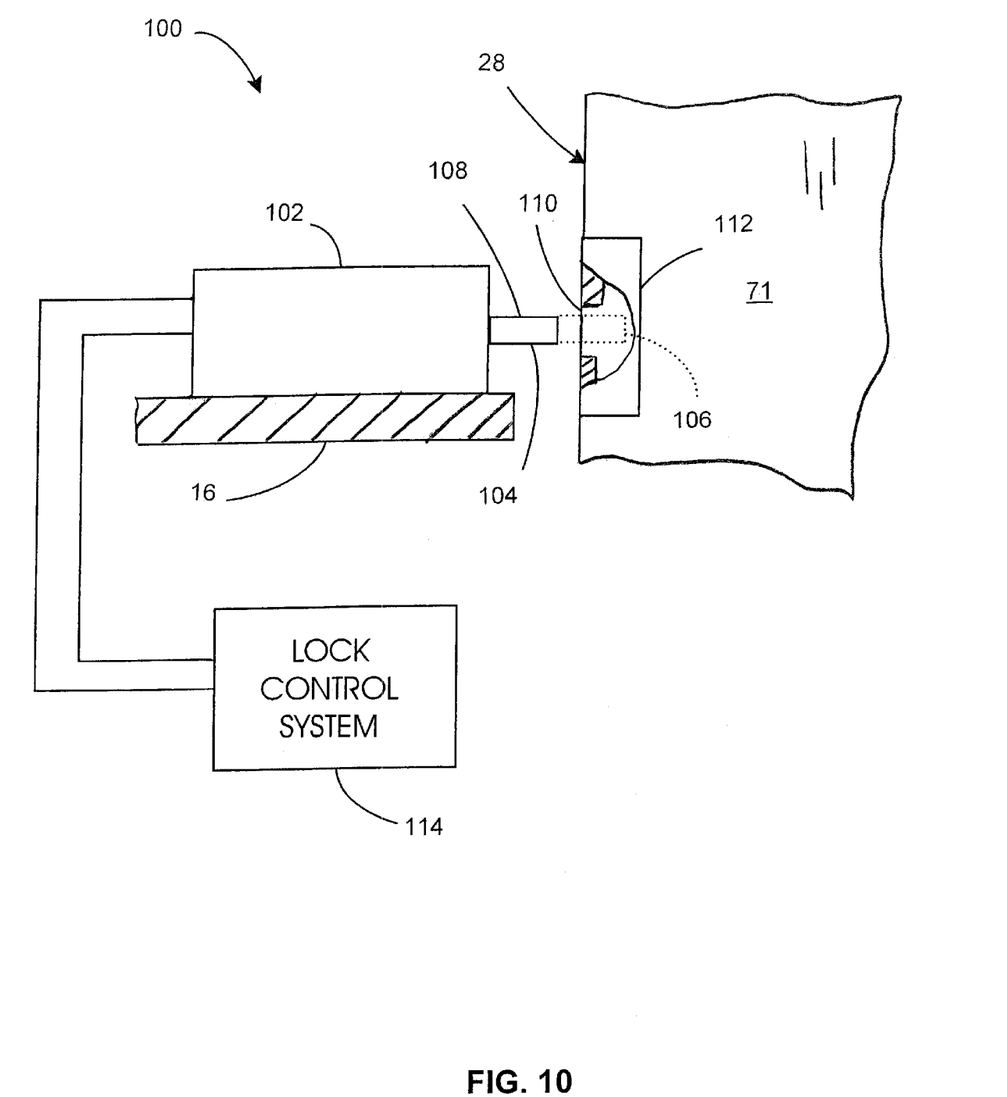
FIG. 10 is a side view in elevation of a lock assembly that may be used to engage the drawer and the cartridge access device shown in FIG. 5.

In still yet another alternative embodiment, a lock assembly or apparatus 100 that is operatively associated with the drawer 16 and the cartridge access device 28 may be provided that is used to engage the cartridge access device 28 and the drawer 16. Referring now to FIG. 10, the lock assembly 100 utilized in one preferred embodiment may comprise a lock actuator 102 for moving a lock bolt or plunger 104 between a locked position 106 and an unlocked position 108. A spring (not shown) may be used to bias the lock bolt 104 in the unlocked position 108. The lock bolt 104 is sized to engage at least one aperture 110 provided in a lock plate 112. A lock control system 114 may be provided, which in response to commands from the host computer system, the control system of the data storage system 12, or the system operator via control panel 36, actuates the lock actuator 102.

Depending on the application, the lock plate 112 may be mounted on or comprise a portion of the cartridge access device 28, and the lock actuator and bolt 102, 104 may be mounted to the drawer 16 or mounting system 17. In the embodiment shown and described herein, the lock plate 112 is mounted to the frame assembly 71 of the cartridge access device 28, and the lock actuator and bolt 102, 104 are mounted to the drawer 16. Alternatively, other arrangements are possible. For example, the lock plate 112 may instead be mounted on or comprise a portion of either the drawer 16 or the mounting system 17, and the lock actuator and bolt 102, 104 may be mounted to the cartridge access device 28.

The various components of the lock assembly 100 may comprise any of a wide range of devices and systems well-known in the art and that are readily commercially available. For example, the lock actuator 102 may comprise an electrically operated solenoid having a plunger 104 sized to engage the hole 110 provided in lock plate 112. In the embodiment shown and described herein, the lock bolt 104 is biased in the unlocked position 108 by a suitable spring (not shown). Consequently, energizing the solenoid will move the lock bolt 104 to the locked position 106 thus engaging the cartridge access device 28 and the drawer 16. Of course, other types of components and operating arrangements could also be used, as would be obvious to persons having ordinary skill in the art.

Since the drawer 16 may contain more than one data cartridge 14, it is generally preferred, but not required, that the data cartridge exchange apparatus 10 be operable to selectively move the drawer 16 to any one of a plurality of intermediate positions between the extended and retracted positions. This allows the data cartridge exchange apparatus 10 to expose for the system operator some, but not necessarily all, of the data cartridges 14 and/or data cartridge positions provided in the drawer 16. It is also preferable to allow the system operator to select the number of data cartridges 14 or the particular data cartridge 14 that is to be made accessible to the system operator. For example, the system operator may enter the selection into the host computer system or into the control panel 36 of the data storage system 12. In response to the system operator's selection, the data cartridge exchange apparatus 10 may then move or extend the drawer 16 a sufficient distance so that the selected number of data cartridges 14 are exposed. By providing the data cartridge exchange apparatus 10 with these features, the system operator's task of locating the desired data cartridges is greatly simplified. Moreover, in the event the system operator chooses to have less than all of the data cartridges 14 within the drawer 16 exposed, the data storage system 12 will need to re-inventory only the data cartridges 14 that were exposed and will not need to re-inventory all of the data cartridges 14 contained within the drawer 16.

The drawer 16 may be secured or held in place when it is not being moved. By doing so, the drawer 16 will remain stationary even if the cartridge access device 28 is disengaged from the drawer 16 and is moved to other locations within the data storage system 12. To hold the drawer 16 in place, a drawer lock assembly or apparatus may be used. The drawer lock assembly may comprise any of a wide range of lock assemblies that are now known or that may be developed in the future. In one embodiment, the drawer lock assembly may be essentially identical to the lock assembly 100, which was discussed above and is shown in FIG. 10, but have a different mounting arrangement. That is, the drawer lock assembly may also comprise a lock actuator 102 for moving a lock bolt or plunger 104 between a locked position 106 and an unlocked position 108, a spring for biasing the lock bolt 104 in the unlocked position 108, a lock plate 112 having at least one aperture 110 therein sized to receive the lock bolt 104, and a lock control system 114 for actuating the lock actuator 102. The lock plate 112 may be mounted to or comprise an integral portion of the drawer 16 so that the drawer 16 may be locked in the extended position, the retracted position, or an intermediate position therebetween. Alternatively, other mounting arrangements are possible and other types of lock assemblies that are now known or that may be developed in the future could also be used.

The data cartridge exchange apparatus 10 may be operated as follows to allow the system operator to access the various data cartridges 14 contained within the data storage system 12. Consider, for example, a situation wherein the data storage system 12 has been provided with a plurality of data cartridges 14. During normal operation, the drawer 16 may remain in the fully retracted or closed position shown in FIG. 2, thereby allowing the cartridge handling system 22 (FIGS. 2 and 4) internal to the data storage system 12 to access all of the data cartridges 14 contained therein. If the need arises for the system operator to access one or more of the data cartridges 14, such as, for example, to remove one or more of the data cartridges 14 and replace it or them with a substitute data cartridge or data cartridges, the system operator may enter instructions for the drawer 16 to be opened into the host computer system or the control panel 36 (FIG. 1) of the data storage system. In response thereto, the control system contained within the data storage system 12 actuates the actuator system 60. The actuator system 60 moves the cartridge access device 28 along the lower guide member 52 and the upper guide member until the cartridge access device 28 is positioned adjacent the drawer 16. The cartridge access device 28 then engages the drawer 16 in one of the manners previously described herein. For example, in one embodiment, the finger assembly 78 of the cartridge access device 28 may be caused to engages the notch 80 provided on a data cartridge 14 contained within the drawer 16. See FIG. 8. Next, the cartridge access device 28 is moved in the direction indicated by arrow 41 by the cartridge positioning system 30 until the drawer 16 is opened (i.e., moved in the direction indicated by arrow 18) in accordance with the system operator's instructions. See FIG. 2. Obviously, if the drawer 16 was secured in place with the optional drawer lock assembly, then the lock control system associated with the drawer lock assembly would first have to be instructed to unlock the drawer 16 and do so before the drawer 16 was moved.

Once the drawer 16 is opened or extended, the system operator may access the exposed data cartridges 14 for the exchange, removal, or replacement of the same. While the drawer 16 is in the extended position, the data storage system 12 may remain operational. That is, the cartridge access device 28 may be disengaged from the drawer 16 so that the cartridge handling system 22 may continue to access the data storage cartridges 14 remaining in the data storage system 12 and accessible to the cartridge access device 28. Preferably, the drawer 16 will be locked with the drawer lock assembly before the cartridge access device 28 is disengaged from the drawer 16, although such is not required.

Once the system operator is finished accessing the exposed data cartridges 14, the system operator may enter instructions into the host computer system or the control panel 36 for the drawer 16 to be closed. Alternatively, the data cartridge exchange apparatus 10 may close the drawer 16 after a predetermined amount of time has elapsed. In either case and assuming that the cartridge access device 28 was disengaged from the drawer 16, the control system actuates the cartridge positioning system 30 which positions the cartridge access device 28 adjacent the drawer 16. The finger assembly 78 is then caused to engage the notch 80 of a data cartridge 14 contained within the drawer 16. Next, the cartridge positioning system 30 moves the cartridge access device 28 in the direction indicated by arrow 43 so that the drawer 16 is moved along therewith in the direction indicated by arrow 19 until the drawer 16 is closed. In the event the finger assembly 78 becomes disengaged from the notch 80 while the drawer 16 is being closed, the finger assembly 78 may then push or exert a force on the data cartridge 14 positioned adjacent to the data cartridge 14 having the notch 80 from which the finger assembly 78 became disengaged so that the cartridge handling system 22 may continue to close the drawer 16.

After the drawer 16 has been fully closed, the system operator or the data storage system 12 may command the lock control system associated with the drawer lock assembly to lock the drawer 16 in the retracted or closed position. Thereafter, the cartridge access device 28 may be disengaged from the drawer 16 and the data storage system 12 may "re-inventory" the data cartridges 14 stored within the data storage system. In the present example, the data storage system 12 need re-inventory only those data cartridges 14 that were exposed to the system operator, which depending on the system operator's instructions may be substantially less than all of the data cartridges 14 contained within the drawer 16.

If the data cartridge exchange apparatus 10 is configured so that the various data cartridges 14 carried by the drawer 16 are contained within one or more cartridge magazines 20, the data cartridge exchange apparatus 10 will allow an entire cartridge magazine 20 to be removed and replaced. For example, in the embodiment shown and described herein, the drawer 16 is configured to receive two cartridge magazines 20, each of which is configured to receive five (5) data cartridges 14. In this example, then, the entire cartridge magazine 20 may be removed by the system operator, thereby allowing for the convenient exchange, removal, or replacement of the plurality of data cartridges 14 contained within the cartridge magazine 20. The cartridge magazines 20 may each be provided with a handle 116 (FIGS. 1 and 2) to allow the cartridge magazines 20 to be conveniently carried by the system operator.

It should be noted that any of the data cartridges 14 contained within the data storage system 12 may be accessed via the data cartridge exchange apparatus 10. For example, data cartridges 14 stored in the magazines 20 that are positioned in the "fixed" cartridge storage array 32 (FIG. 2) located opposite the drawer 16 also may be accessed by instructing the cartridge handling system 22 to move the selected data cartridges 14 from the "fixed" cartridge storage array 32 (i.e., those cartridge magazines 20 that are not contained in the drawer 16) to the "moveable" cartridge storage array 34 (i.e., those cartridge magazines 20 that are contained in the drawer 16). After the selected data cartridges 14 have been transferred from the fixed cartridge storage array 32 to the moveable cartridge storage array 34, the cartridge handling system 22 may then open the drawer 16 to provide the system operator with access to the recently transferred data cartridges 14. Alternatively, if the data storage system 12 is provided with a second drawer 16' as shown in FIG. 3, the system operator may access the data cartridges contained in the second drawer 16' in the manner already described for the first drawer 16.

It is contemplated that the inventive concepts herein described may be variously otherwise embodied and it is intended that the appended claims be construed to include alternative embodiments of the invention except insofar as limited by the prior art.

What is claimed is:

1. Data cartridge exchange apparatus for a data storage system, comprising:
   a cartridge handling system, said cartridge handling system comprising:
      a cartridge access device having a bearing member mounted thereto;
      a guide member operatively associated with the data storage system, said guide member comprising a channel and a substantially continuous section located adjacent said drawer, the bearing member of said cartridge access device engaging the channel of said guide member; and
      an actuator system operatively associated with said cartridge access device, said actuator system moving said cartridge access device along said guide member; and
   a drawer sized to receive at least one data cartridge, the drawer being engagable with said cartridge access device of said cartridge handling system so that said drawer may be moved by the cartridge handling system between a retracted position and an extended position.

2. The data cartridge exchange apparatus of claim 1, wherein said actuator system comprises:
   a gear rack positioned adjacent said guide member, said gear rack comprising a substantially continuous member extending along the substantially continuous section of said guide member;
   a pinion gear mounted for rotation on said cartridge access device, said pinion gear engaging said gear rack; and
   a motor operatively associated with said pinion gear for rotating said pinion gear to cause said cartridge access device to move along said guide member.

3. The data cartridge exchange apparatus of claim 1 wherein the substantially continuous section of said guide member is positioned substantially parallel with the direction of movement of said drawer.

4. The cartridge exchange apparatus of claim 1, wherein said cartridge access device comprises a first finger assembly configured to engage said drawer, the first finger assembly and said drawer being engaged when said drawer is being moved between the retracted and extended positions by said cartridge handling system.

5. The data cartridge exchange apparatus of claim 4, wherein said drawer is provided with a notch adapted to receive said first finger assembly, said first finger assembly and the notch being engaged when said drawer is being moved between the retracted and extended positions by said cartridge handling system.

6. The data cartridge exchange apparatus of claim 4, wherein said cartridge access device further comprises a second finger assembly configured to engage said at least one data cartridge.

7. The data cartridge exchange apparatus of claim 1, wherein said drawer comprises a finger assembly configured to engage said cartridge access device, the finger assembly and said cartridge access device being engaged when said drawer is being moved between the retracted and extended positions by said cartridge handling system.

8. The data cartridge exchange apparatus of claim 1, further comprising a lock assembly operatively associated with said drawer and said cartridge access device, said lock assembly being usable to engage said cartridge access device and said drawer, said lock assembly engaging said cartridge access device and said drawer when said drawer is being moved between the retracted and extended positions by said cartridge handling system.

9. The data cartridge exchange apparatus of claim 8, wherein said lock assembly comprises:
   a lock actuator operatively associated with said data cartridge exchange apparatus;
   a lock bolt operatively associated with the lock actuator, the lock actuator moving the lock bolt between a locked position and an unlocked position; and
   a lock plate having an aperture therein sized to receive the lock bolt.

10. A data cartridge exchange apparatus comprising:
   a cartridge handling system comprising a cartridge access device having a first finger assembly;

a drawer sized to receive at least one data cartridge, the drawer being engagable with the first finger assembly of said cartridge access device so that said drawer may be moved by said cartridge handling system between a retracted position and an extended position, wherein said at least one data cartridge defines a notch adapted to receive said first finger assembly, said first finger assembly and the notch being engaged when said at least one data cartridge is positioned within said drawer and when said drawer is being moved between the retracted and extended positions by said cartridge handling system.

11. The data cartridge exchange apparatus of claim 10, further comprising a drawer lock assembly mounted to said data storage system, said drawer lock assembly engaging said drawer to secure said drawer in place.

12. The data cartridge exchange apparatus of claim 10, wherein said drawer comprises a plurality of data cartridge storage locations, wherein said drawer is movable to expose one or more of said plurality of data cartridge storage locations, and wherein said cartridge handling system moves said drawer to expose a selected one or more of said plurality of data cartridge storage locations.

13. The data cartridge exchange apparatus of claim 10, wherein said drawer is movable to any one of a plurality of positions between the extended and retracted positions, and wherein said cartridge handling system moves said drawer to a selected one of said plurality of positions.

14. The data cartridge exchange apparatus of claim 10, wherein said drawer is sized to receive at least one cartridge magazine, said at least one cartridge magazine being sized to receive said at least one data cartridge.

15. The data cartridge exchange apparatus of claim 10, wherein said drawer is slidably mounted to said data storage system.

* * * * *